United States Patent [19]

Erlichman

[11] Patent Number: 4,596,993
[45] Date of Patent: Jun. 24, 1986

[54] THERMAL RECORDING SYSTEM AND METHOD

[75] Inventor: Irving Erlichman, Wayland, Mass.

[73] Assignee: Polaroid Corporation, Cambridge, Mass.

[21] Appl. No.: 676,502

[22] Filed: Nov. 29, 1984

[51] Int. Cl.⁴ ............................................. G01D 15/10
[52] U.S. Cl. ................. 346/76 PH; 400/120; 346/76 L
[58] Field of Search ............. 346/76 PH, 76 R, 1.1, 346/154, 201, 76 L, 208; 369/116, 144; 101/93.03; 355/83; 219/216 PH; 400/120; 358/298

[56] References Cited

U.S. PATENT DOCUMENTS

| | | | |
|---|---|---|---|
| 3,577,137 | 5/1971 | Brennan | 340/324 |
| 4,064,205 | 12/1977 | Landsman | 264/25 |
| 4,283,785 | 8/1981 | Miyauchi et al. | 369/116 |
| 4,355,318 | 10/1982 | Miyamchi | 346/76 |
| 4,407,003 | 9/1983 | Fukui | 346/76 |
| 4,412,229 | 10/1983 | Wada et al. | 346/108 |
| 4,442,342 | 4/1984 | Yomeda | 219/216 |
| 4,504,837 | 3/1985 | Toyoda et al. | 346/76 PH |

OTHER PUBLICATIONS

IBM Tech. Disc. Bulletin "Print Current Adjustment for Electrothermal Printers" Long et al. vol. 25, No. 4, Sep. 1982.

Primary Examiner—A. Evans
Attorney, Agent, or Firm—John S. Vale

[57] ABSTRACT

A closed loop thermal recording system and method are provided for recording an image represented by pixel areas of varied density on a thermally sensitive recording medium. The system receives electronic image information defining a desired density for each pixel area and applies thermal energy to selected pixel areas to record in each a dot having an initial size that is smaller than necessary to achieve its desired density. The density levels provided by the initial dots are measured and compared to desired density. Based on these comparisons, additional thermal energy is applied to progressively to increase dot size until a predetermined density comparison value is achieved for each selected pixel area.

38 Claims, 9 Drawing Figures

THERMAL RECORDING SYSTEM AND METHOD

BACKGROUND OF THE INVENTION

The present invention relates to the field of thermal recording or printing and, more specifically to a thermal recording system and method for recording grey scale images on thermally sensitive recording media.

Thermal printing potentially is a very attractive process for providing low cost "hard copies" of electronically recorded images. Unlike expensive silver halide based photographic reproduction materials, thermally sensitive paper or the like is relatively inexpensive.

To date, this potential has not been fulfilled because certain aspects of the thermal process have not been controlled adequately to produce acceptable tonal or grey scale renditions. While this process works well in the high contrast binary mode (black or white) to print sharp dot matrix alphanumeric characters or line drawing graphics, attempts to introduce grey scale, for example to reproduce a photographic image, have been disappointing.

Conventional half-tone lithographic printing processes, both color and black and white, are capable of producing high quality photograph-like tonal image reproductions with resolutions in the range of 150 to 300 lines per inch. The printed image is formed by a matrix array of pixels, each having an assigned tonal density within a grey scale that extends between white and black or between very light and very dark colors. Each printed pixel comprises one pixel area in a grid or matrix of uniformly sized areas on the print receiving sheet (e.g. white paper) and either no dot or a dot of varying size printed therein. If no dot is printed, incident light is reflected from the entire pixel area to represent the lowest density (brightest) or lightest pixel in the grey scale. When a very small dot is printed in the pixel area, the eye perceives the area as a very light grey and it may have a density of about 5% in the grey scale. A larger dot covering approximately half the pixel area is perceived as a neutral grey or a 50% density pixel. When the dot size is increased still further to fill or almost completely fill the pixel area, the pixel is perceived as a black or a 95% to 100% density pixel.

The quality of the image production increases with increasing grey scale range. Range, in turn, depends on the ability to accurately vary dot size in discrete narrow steps between a minimum and a maximum size. In commercial quality lithography, it is not uncommon for the grey scale to have 128 or more steps which is indicative of just how well dot size is controlled.

By analogy, high quality grey scale images may be reproduced by thermal printing if the process is capable of forming dots or marks which can be made to vary in size or area on an accurately controlled basis to provide an acceptable range of pixel densities.

In contrast to the high resolution reproduction capabilities of lithographic printing or photography, thermal recording tends to be a low resolution process because it is difficult to establish control over the many variable process parameters.

For example, in a typical thermal dot matrix printer, a sheet of paper having a thermally sensitive layer thereon is placed between a thermal print head, confronting the layer, and a rubber roller or platen which presses against the backside of the sheet to establish pressure contact between the head and layer. The print head typically comprises an array of electrically resistive elements which generate heat when current is passed therethrough. Each element is configured to be switched on and off individually and specified elements are turned on simultaneously to form a corresponding character or part of a character. The head may have a single array of a few elements and be indexed horizontally across the paper to print a line, or it may consist of a linear array disposed in a horizontal row across the width of the paper to print a full line at a time.

The thermally sensitive coating generally includes a heat sensitive dye that is very light or transparent at room temperature and changes color or becomes dark when exposed to thermal energy which exceeds a threshold temperature. Typically, these dyes react at temperatures in the range of 140° to 300° F. Once the dye reaction threshold temperature has been exceeded, a dot or mark begins to appear and it progressively grows in size in response to the continued application of thermal energy. Typically, the dot grows to fill the entire pixel area contacted by an individual element, but blooming, or growth beyond the element boundaries, may occur if the heat is applied too long.

We will assume for the moment that the thermal paper is consistent in its response to heat exposure over its entire area, which generally is not the case.

The goal in dot matrix printing is to make each dot of uniform size in density. If each resistive element in the head array is not of exactly the same resistivity, there will be variations in heat output among the elements which are subjected to the same supply voltage, and this works against uniform dot size.

If, during the course of the printing process the supply voltage varies, the thermal output of the heat elements will change and result in uneven dot production.

Residual heat and thermal inertia are other variable parameters that present major obstacles to accurately controlling the thermal output of each individual heat element in the array. For example, assume that there are seven elements in a vertical array. Suppose that to print the first part of the character it is required that all seven elements be energized, and to print the next adjacent part of the character, only one of the seven is to be energized. When all of the elements are energized simultaneously, there is maximum heat build up in the array. While the array is designed to cool down rapidly once the current is turned off, there is the possibility that there will be some residual heat therein when the next electrical impulse is applied to actuate the single element. That means that the single element will overshoot the design temperature and not produce a dot of the desired size and density.

In addition to variations in supply voltage, resistivity of the individual elements, and residual heat problems, other variable parameters associated with thermal printing which may work against producing uniform dots include possible variations in pressure contact between the head and the paper, due to local variations of resiliency in the rubber roller or platen, and variations in the scanning rate at which the head is moved across the paper. If the scanning rate slows down, heat application time increases thereby increasing the cumulative thermal energy applied to a pixel area which results in the production of a larger dot then when the scanning rate is faster and less total heat is applied.

In the preceding discussion of the variable parameters associated with the thermal printer, it was assumed that the thermal recording medium was consistent in thermal response over its entire area. Experience has shown that in actual practice, one can expect variations in heat response from sheet to sheet taken from the same box, and it is not uncommon to find variations in response on the same sheet due to uneven coating thickness or non-uniform chemical response at different locations in the coating. Also, variations in the thickness of the base paper over the course of one sheet, and from sheet to sheet, tend to cause changes in the pressure contact the print head makes with the thermally sensitive layer which again tends to work against producing uniform dot size.

Thermal recording systems known in the prior art acknowledge the existence of the above noted variable parameters and disclose a variety of control systems designed to improve the uniformity of dot size or line width.

For example U.S. Pat. Nos. 4,407,003 and 4,442,342 disclose control systems wherein a sensor detects the amount of voltage applied to the print head and, via a feedback loop, adjusts the time the print head applies heat to a given location to insure that a uniform amount of thermal energy is applied to form each dot.

U.S. Pat. No. 3,577,137 discloses a thermal printer control system wherein the temperature of the print head is sensed by a diode located in an adjacently mounted integrated circuit immediately prior to the next print cycle, and the power applied to drive the head during the print cycle is adjusted in accordance with this reading. This system compensates for residual heat and applies consistent amounts of thermal energy to each location to form dots of a uniform size.

U.S. Pat. No. 4,412,229 discloses an XY plotter which utilizes a laser printhead. This patent acknowledges that when the head moves slowly the recorded line is thicker than when the head moves rapidly because of the difference in the amount of thermal energy applied at the different head velocities. Using a control system, head velocity is anticipated and the power input to the laser is varied accordingly (i.e. higher voltage for high velocity) to produce a uniform line.

U.S. Pat. No. 4,064,205 discloses a laser printing system for making thermal plastic lithographic printing plates. A plastic plate is initially covered with a transfer sheet of infrared absorbing material and is scanned to replicate an original document. After scanning, the transfer sheet is stripped away leaving the absorbing material on selected areas of the plate to be depressed by melting when exposed to an infrared beam. In one embodiment, Col. 4, Line 60, a sensor reads the sheet just ahead of the scanning beam looking for the infrared absorbing material. If the sensor output signal indicates the absence of infrared absorbing material, the laser beam is maintained at a low energy output state to inhibit melting. When the sensor does detect the infrared material, the laser beam output is automatically switched from low to high to selectively melt or deform the covered area.

U.S. Pat. No. 4,355,318 is directed to a laser data recording system wherein an opaque plastic medium is rendered transparent in spots where it is selectively heated with the laser beam. A photocell is placed on the underside of the medium to sense whether or not a desired transparent spot has been created by comparing the photocell reading with the input signal to the recording laser. An error signal indicates that data has not been properly recorded either because of a data error or an imperfection in the recording material. In another embodiment, the photocell looks at a recording medium just ahead of the laser beam recording track to sense and identify pin hole defects in the medium.

All of these above noted prior art thermal printing systems utilize some type of sensor to detect a variable parameter and a feedback loop to make adjustments or compensations in the process based on the conditions detected by the sensor. However these disclosures generally are directed to achieving dot or line uniformity and do not address the proposition of providing variable density pixels by adjusting the size of the dots printed therein to provide a halftone-like grey scale reproductive capability.

Therefore, it is an object of the present invention to provide a thermal recording system and method for making tonal or grey scale images on a thermally sensitive recording medium.

Another object is to provide a thermal recording system and method capable of producing variable density pixels on a thermally sensitive medium.

Yet another object is to provide such a system and method that is configured to receive electronic image signals and to reproduce a visual image, in accordance with the signals, on a thermally sensitive medium.

Another object is to provide such a system and method that is capable of producing dots of various size, in an accurately controlled manner, on a thermally sensitive medium.

Other objects of the invention will, in part, be obvious and will, in part, appearinafter.

SUMMARY OF THE INVENTION

The present invention provides a thermal recording system for recording an image represented by areas of varied density on a thermally sensitive medium of the type wherein the size of a recorded dot progressively increases with increased amounts of thermal energy applied to form the dot.

The recording system includes means for receiving image information indicative of a desired density for each pixel area on the desired image; means operable for applying thermal energy to selected pixel areas on the medium to form a dot in each having an initial size smaller than necessary to achieve desired density; evaluating means for monitoring the density of each of the selected pixel areas and for comparing the monitored density of each to its desired density; and means responsive to the evaluating means for regulating the energy applying means to progressively increase the dot size in each of the selected pixel areas until a predetermined value of density comparison is achieved for each such pixel area.

One salient feature of the recording system is its ability to form dots of different sizes and to do so in a precisely controlled manner. This allows the formation of varied density pixels which cooperate to define a grey scale image in a manner that is similar to half-tone lithography. The present recording system is especially well suited for making "hard copies" of electronically recorded images.

Many prior art thermal recording systems tend to use indirect monitoring methods to control dot formation. That is, they typically sense parameters such as head voltage, temperature or velocity and adjust power inputs accordingly to produce a resultant dot.

The present system is configured for closed loop operation and utilizes a much more direct approach in that it monitors the dot during its formation by sensing the density of the pixel area in which the dot is being formed. The system automatically compares the monitored density with the target or desired density and, based on the comparison, selectively applies additional amounts of thermal energy to progressively increase dot size until a predetermined value of density comparison is achieved. By monitoring output, i.e. dot formation, rather than input parameters, precise control is more easily and inexpensively obtained.

In one embodiment, wherein an image is to be recorded with a resistive heat element print head on a thermally sensitive paper, the monitoring of a dot during its formation with a photocell detector is made possible by applying the heat to the back side of the paper, rather than directly to the thermal layer on the front side, thus providing an unobstructed field of view for the photocell during dot formation.

The present invention is also directed to a method of recording grey scale images on a thermally sensitive recording medium.

BRIEF DESCRIPTION OF THE DRAWINGS

For a fuller understanding of the nature and objects of the present invention, reference may be had to the following detailed description taken in connection with the accompanying drawings wherein.

DESCRIPTION OF THE PREFERRED EMBODIMENT

Figure 1:
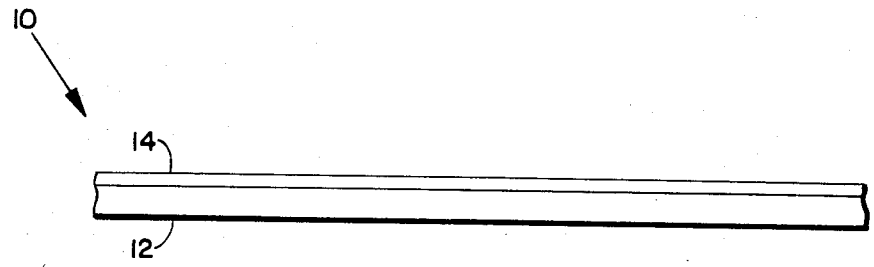
FIG. 1 is an elevational view of a thermally sensitive recording medium.

The present invention provides a system and method for thermally recording grey scale or tonal images on a thermally or heat sensitive recording medium typified by a thermal recording sheet or paper 10 diagrammatically illustrated in FIG. 1.

Sheet 10 comprises a planar support or base layer or sheet 12 having a thermally sensitive recording layer 14 coated on or otherwise applied to one side thereof.

The base sheet 12 generally is a flexible light-colored opaque medium formed of paper or plastic that serves both as a support for layer 14 and a light reflective background against which recorded dot, marks or other characters formed in layer 14 are viewed.

The thermally responsive layer 14 generally is transparent or is of a color that closely matches that of the base sheet 12 so as not to be visible prior to recording. Generally, layer 14 is a chemical composition that has heat sensitive dyes therein. The dyes are colorless or invisible against the background at temperatures below a mimimum or threshold activation temperature. Upon application of thermal energy which exceeds the threshold temperature, generally in a range of 140° to 300° F., the dye turns dark and becomes visible when viewed by reflected light. Typically, layer 14 is of the chelate or leuco type.

Any number of commercially available thermal recording papers are suitable for use with the system and method embodying the present invention. Representative examples of these include Type 160, 161 and 162 papers manufactured by the 3M Co.; types Lt-1, Lt-2, 2-3, and 181301 (HT) manufactured by National Cash Register Corp.; and "Thermaprint" manufactured by Nashua Corp.

Thermal recording paper is commonly used in conjunction with a dot matrix thermal printer to provide alphanumeric "hard copy" output from computers, calculators, banking machines or electronic cash registers.

Figure 2:
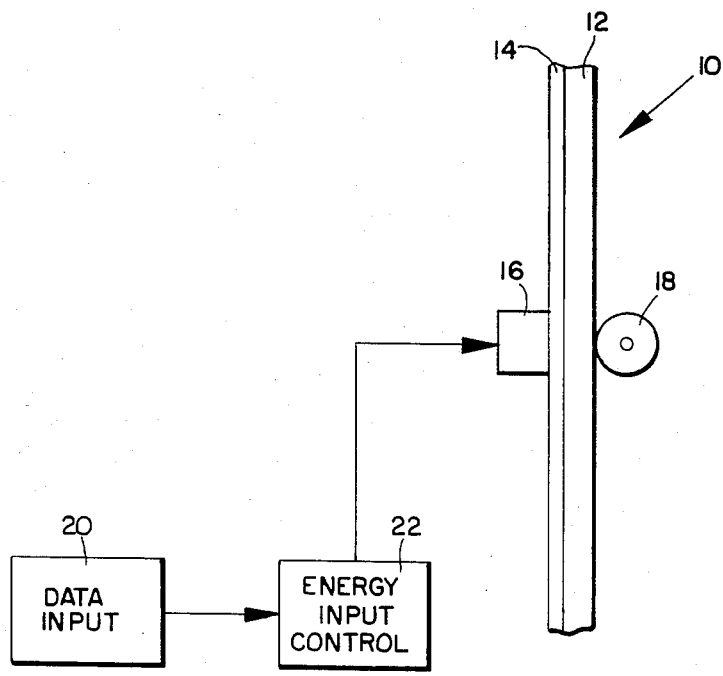
FIG. 2 is a diagrammatic representation of a prior art thermal printer.

As diagrammatically shown in FIG. 2, in a typical prior art thermal printer, the thermal recording sheet 10 is fed between a thermal print head 16, confronting layer 14 and an oppositely disposed pressure roller or platen 18 that engages the back of base sheet 12 and urges layer 14 into operative pressure contact with resistive heat elements of head 16. Digital data input signals, represented by block 20, provided from a computer or a data storage device are fed to an energy input controller 22 which selectively energizes individual heat producing elements in head 16 to print dot patterns that form alphanumeric characters corresponding to the data input signals.

The thermal print head 16 typically comprises an array of individually addressable, electrically resistive, print elements which are energized by the application of voltage to produce heat as current flows therethrough. The heat produced by an element is applied to a localized pixel area in layer 14 in contact with the energized element to activate the dye and produce a visible dot therein.

The print head 16 may include a horizontally extending array of elements that spans the width of the paper for printing a line at a time, or it may include a smaller matrix of elements and be mounted for horizontal movement back and forth across the paper to print characters serially.

Figure 3:
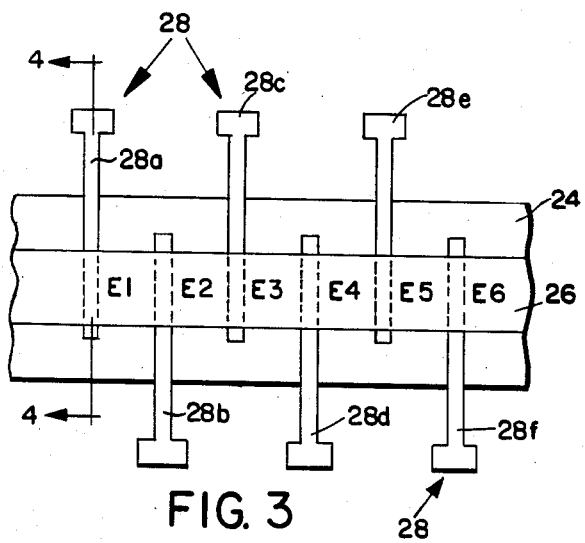
FIG. 3 is a plan view of a portion of a thermal print head showing a plurality of heating elements.
Figure 4:
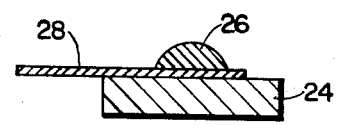
FIG. 4 is a cross sectional view of the heating element structure taken along lines 4—4 of FIG. 3.

One type of print head 16 commonly employed in thermal line printers is diagrammatically shown in FIGS. 3 and 4. It comprises an elongated rectangular substrate 24 made of ceramic, glass or the like, a continuous elongated heater strip 26, extending horizontally along the length of substrate 24, formed of a thin or thick film electrically resistive material, and a plurality of equally spaced, interdigitated, metal conductors or leads 28 which make electrical contact to the underside of resistant strip 26. As best shown in FIG. 4, the lateral cross section of strip 26 generally is convex making it thicker in the center than at the lateral edges.

The electrical leads 28 serve to divide the continuous strip 26 into a serial array of individually addressable thermal heating elements E. When an energizing voltage, typically in the range of 12 to 18 volts, is applied between leads 28a and 28b, it causes a current to flow through that rectangular portion of strip 26 therebetween designated element E1. The current flow through the resistive material of element E1 generates thermal energy or heat which impinges upon the pixel area of layer 14 in contact with element E1 causing the dye therein to react and change color once the threshold temperature is exceeded. The next element E2 in the array may be energized by applying voltage between its corresponding bordering leads 28b and 28c. Likewise, the next successive element E3 may be energized by impressing voltage between leads 28c and 28d, . . . etc.

Any individual element E in the linear array may be energized simply by applying voltage between its corresponding bordering leads 28. The leads 28 generally are connected to a matrix switching system (not shown) which facilitates the application of energizing voltage to selected leads 28. Through the switching system, any or all of the elements E may be energized simultaneously in response to appropriate data input signals.

Figure 5:
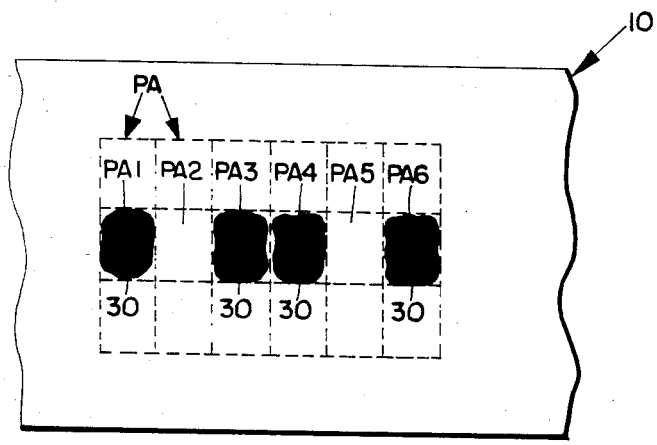
FIG. 5 is a plan view of a portion of the recording medium showing several recorded dots located within corresponding pixel areas.

The performance goal in dot matrix printing is to make each of the dots or marks of uniform size and density. FIG. 5 diagrammatically shows a portion of a thermal sheet 10 divided by imaginary dotted lines into a column and row matrix of rectangular or box-like pixel areas PA. Each pixel area PA is of uniform size.

Assume for the moment that the head 16 illustrated in FIG. 3 is pressed against layer 14 of sheet 10 so that elements E1–E6 are in overlying registration and in contact with corresponding ones of the pixel areas in the middle row PA1–PA6.

By applying voltage to the appropriate leads 28 to energize elements E1, E3, E4 and E6 for a selected period of time, dots or marks 30 are formed in the corresponding pixel areas. The voltage generally is applied in the form of a pulse having a duration in the range of 2 to 10 milliseconds depending on the sensitivity of the particular thermal paper used. The dots 30 more or less substantially fill the corresponding pixel areas and have a more rectangular than round shape in that they tend to replicate the individual heating elements E which are rectangular. It should be understood that the term dot when used herein means a mark of any kind in a pixel area within which the dye has been activated such that it is visible. Dots may be of any shape including circular, rectangular, or having uneven or jagged edges so as not to be classifyable in terms of commonly used shape designations.

Upon observing the formation of the dot 30, one finds that it tends to progressively increase in size or area over the course of its formation during which thermal energy is applied to the corresponding pixel area by the heated element E.

Figure 6:
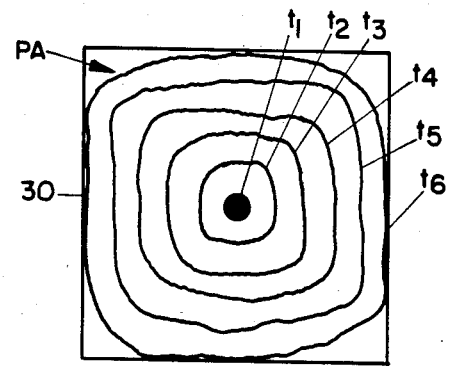
FIG. 6 is an enlarged plan view of one pixel area showing a progressive increase in dot size.

As is diagrammatically shown in FIG. 6, which is a greatly enlarged view of a pixel area PA, the dot 30 generally initially appears as a very small (compared to the total area of PA) mark in the center portion of PA at a time T1 following the energization of the corresponding print head element E at time T0. During the interval between T0, when voltage is applied and T1 (typically in the range of 0.5 to 2 milliseconds) the element E heats up sufficiently to exceed the threshold temperature at which the dye reacts by turning dark and the small initial dot 30 appears. In response to continued thermal energy exposure, the dot or mark 30 grows in area and progressively gets larger indicated by the irregularly shaped dotted rings which are meant to diagrammatically show the outer edges of the expanding dot 30 at subsequent times T2–T5. At T5, the element E is deenergized.

It is not unusual, however, for the dot 30 to "grow" slightly larger, as indicated by the outermost ring indicating dot size at T6, due to residual heat in sheet 10 and the thermal inertia of the heated element. Residual heat and thermal inertia cause a very short interval of continued thermal energy input after deenergization even though the print elements are designed to cool very quickly after the voltage is turned off. At T6, the thermal energy input has dropped off to the point where the temperature in the pixel area PA is below threshold and no further dot growth occurs. If the element E is energized beyond T5, it is possible for the dot 30 to grow slightly beyond the imaginary bounds of PA. This effect is commonly referred to as "blooming".

As noted earlier, in dot matrix printing the goal is to make all of the dots 30 the same full size which fills or substantially fills its corresponding pixel area PA. If, however, there are variations in the voltage applied to different elements E, or if there are variations in the electrical resistivity among the different elements in the linear array responding to a constant applied voltage, there will be variations in the total thermal output of various elements E which will result in variations in the size or areas of their resultant dots 30. Also, there may be variations in the sensitivity of layer 14 which may cause variations in the resultant dot size for a given amount of thermal energy input.

The above description of dot growth assumes continuous energization of the heating element E which is turned on at time T0 and subsequently turned off at T5. Once the threshold temperature is exceeded, the dot progressively grows in response to continued thermal energy input which may be expressed in terms of electrical power input to the heating element E in watts (IE) integrated over the time period T0–T5 during which power is applied. Thus, the size or area of dot 30 increases with increases in the cummulative or total amount of thermal energy applied to form the dot.

It has also been observed that a full sized dot 30 may be formed in steps by applying successive, short duration, pulses of thermal energy to layer 14. With reference to FIG. 6, if the supply voltage is turned off at T1 just as the small dot 30 in the center becomes visible, the dot will grow slightly larger due to residual heat and thermal inertia. But when the temperature drops below threshold, dye conversion stops and dot growth is terminated.

Dot growth may be restarted by subsequently turning on the element E. Dye conversion beyond the edges of the existing dot doesn't start immediately because there is a delay until the heat input pushes the temperature up over threshold. But, once the threshold temperature is exceeded, dye activation is initiated once again and the dot 30 progressively increases in area until the process is terminated by turning off the supply voltage to element E. This process may be repeated a number of times until the dot reaches its full size substantially filling the pixel area PA. Thus, dot size or area may be progressively increased in steps by a series of separate inputs of thermal energy.

The present invention is directed to producing grey scale images on a thermally sensitive medium by producing dots of various size thereon in a controlled manner in much the same way that half-tone lithography employs variations in dot size to represent pixel densities ranging from light to dark.

If a pixel area PA has no dot form therein, incident light is reflected from the entire light colored pixel area and this pixel is perceived as being of the lowest density or lightest tone on the grey scale. A small dot 30 in the pixel area PA, such as the one shown on FIG. 6, absorbs some of the incident light and the pixel is perceived as a light grey having a density of approximately 5 to 10%. The full sized dots 30 shown on FIG. 5, which substantially fill the corresponding pixel areas PA minimize reflected light which result in these pixels being perceived as dark or high density pixels having a density in the range of approximately 90 to 100%.

As we have seen earlier, dot size and therefore the perceived density of a pixel, comprising a pixel area PA having either no dot 30 therein or a dot 30 having a size somewhere a minimum and maximum, is a function of the amount of thermal energy applied to the layer 14 of the pixel area. If the power input to the element E is known or can be accurately calculated, then dot size or pixel density can be regarded as a function of the time period during which heat is applied. Theoretically, it is possible to vary dot size or pixel density simply by varying the duration of the thermal energy input. For small dots or low pixel density, the element E would be energized for a short time. For larger dots or higher density pixels, the heat application period would be increased proportionately.

In practice, however, this concept does not produce satisfactory results in that the actual amount of thermal energy transferred to layer 14 does not correlate well with heat application time. Generally, this is caused by variations in the electrical characteristics of the individual elements E, variations in thermal inertia and heat buildup in the print heat 16 caused by energizing different combinations of elements E simultaneously, and possible variations in input voltage to the elements E forming the array. Achieving control over dot size is also made more difficult because there may be variations in the thermal sensitivity of layer 14 at different locations on the same sheet 10.

Unlike prior art systems and methods that attempt to achieve control of dot size (and therefore pixel density) by sensing process parameters such as print head temperature, input voltage, or head scanning rates and make corrective adjustments accordingly via a feedback loop, the thermal recording system and method embodying the present invention looks not to input parameters to achieve control, but rather to the results of the process, namely the dot itself.

Broadly speaking, closed loop control is achieved by sensing the dot as it is being formed, evaluating whether or not the dot is large enough by comparing it to a reference indicative of desired pixel density, and, if necessary, applying additional thermal energy input to further increase dot size until a predetermined comparison value is achieved.

Figure 7:
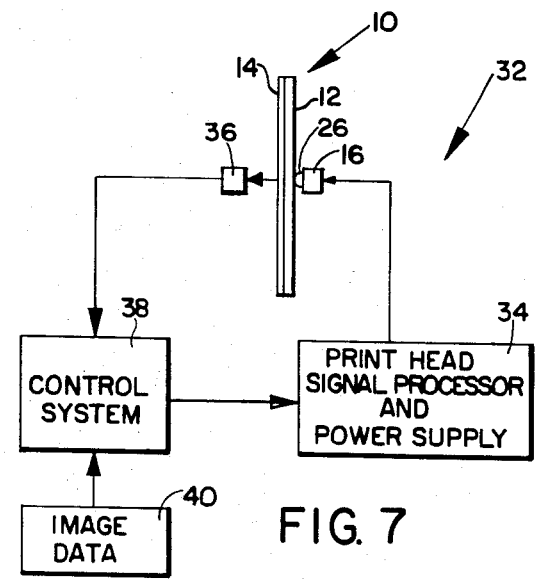
FIG. 7 is a diagrammatic representation of a thermal recording system embodying the present invention which employs a medium engaging resistive print head.

A thermal recording system 32, embodying the present invention, is shown in block diagram form in FIG. 7. Its components include a resistive type thermal print head 16 comprising a linear array of individually addressable elements E; a print head signal processor and power supply 34 operable to selectively energize each of the elements E in the array; a linear array electrooptical or photocell detector 36 directed at the line of pixel areas on sheet 10 which are registered with the print head elements for optically sensing pixel density by measuring brightness or the level of reflected light; and a control system 38. The control system 38 includes means for receiving electronic image signals 40 which define a target or desired density for each of the pixels that collectively define an electronically recorded image which is to be printed or recorded on sheet 10. Typically, these are digital signals that are provided from a computer or a digital data storage device. Additional system 38 may be equipped to receive analog video signals and convert them to digital form internally.

In the typical prior art thermal recording system described earlier in connection with FIG. 2, the print head 16 is pressed directly against layer 14. However, in this position the head 16 covers the dots 30 while they are being formed and they are not visible until sheet 10 is indexed vertically to clear the head 16 subsequent to dot formation.

In system 32, the print head 16 is located on the backside of sheet 10, pressing against the base sheet 12, and the optical monitoring or sensing means, in the form of the photocell array 36, is located on the opposite side of sheet 10 where it has an unobstructed field of view of that portion of layer 14 registered with the print head 16 for sensing dot formation on the front side of sheet 10. When a heating element in print head 16 is energized, thermal energy flows through base sheet 12 and impinges layer 14 from the backside to form a dot therein by dye activation.

There is one disadvantage to heating sheet 12 from the backside. Base sheet 12, being formed of paper or plastic, is not a particularly good thermal conductor. Therefore it takes slightly longer for the temperature to build up to the threshold value that if the thermal energy is applied directly to layer 14. This, of course, slows down the recording process slightly. But, this inconvenience is overshadowed by two major advantages.

First, because dot formation is not obscured by the head 16, it can be easily monitored with the photocell detector 36 to provide a high degree of control over dot size, and therefore pixel density, as will become apparent later. Secondly, it has been unexpectedly discovered that the density of the dots formed in this manner tends to be more uniform across the dot area than when heat is applied directly to layer 14. Although the mechanisms causing this are not well understood at this time, one may speculate that the base sheet 12 acts as a buffer that beneficially influences the distribution of thermal energy as it traverses the base sheet 12 to produce more uniform dot density.

The control system 38 preferably includes a microprocessor, memory, and suitable I/O devices to process the image data input signals and light level signals received from photodetector 36, and in response to these signals control the operation of the print head signal processor power supply 34 so as to regulate the operation of print head 16.

Recording system 32 is a closed loop system which uses feedback to achieve precise control over pixel density. It establishes in memory a reference grey scale signal for each pixel in the current line to be recorded indicative of a target or desired density for that pixel. Based on the reference signals, it consults a lookup table and selects an appropriate pulse duration time for an initial application of thermal energy to each selected pixel area PA that is calculated to produce an initial dot that is smaller than necessary to achieve target density.

For example, the initial pulse duration may be set to produce a dot that is approximately 75% of the size necessary to achieve the target density. Control system 38 then actuates the signal processor and power supply 34 which energizes each of the elements E corresponding to pixel areas in the row in which dots are to be recorded for its selected initial pulse duration. In response to this input, the selected elements E in print head 16 are heated accordingly to form the initial dots. Following deenergization of the heating elements E and an intentionally provided short delay to be sure that any additional dot growth attributable to heat buildup and thermal inertia is complete, the photodetector array 36 is actuated to provide a light level reading for each of the pixel areas in the row. Ambient light impinges upon layer 14 and is reflected therefrom to the individual photocells in array 36. If no dot or a small initial dot has been printed in a given pixel area, a large percentage of incident light will be reflected from the pixel area and produce a relatively high light level reading. Larger initial dots will absorb more of the incident light and therefore the light level readings from these pixel areas will be lower.

The light level readings are correlated to greyscale density. Thus, the photocell detector 36 provides signals to the control system 38 that are indicative of the actual perceived density of each pixel in the line.

Control system 38 includes means for comparing the photocell readings with the reference signals that indicate the target or desired density. Because the initial pulse duration was selected to form dots smaller than necessary to achieve target density, in general, the observed density should be lower than the target density. However, because of variations in the heating elements, or supply voltage or sensitivity of the paper, some of the dots may actually be larger than expected and produce an observed density that matches or is very close to target density. In these cases, control system 38 will note that the initial dot is large enough to satisfy the density requirement and will automatically preclude further application of thermal energy which would further increase dot size.

In most cases however, the initially recorded dots will be undersized and the comparison will provide a signal indicating further thermal energy input is required to make the dot grow larger. Control system 38 then determines the duration of the next application of thermal energy and operates the power supply 34 once again to energize those elements E corresponding to pixel areas that require additional dot growth. This next application of thermal energy is of shorter duration than the initial pulse in that now the goal is to increase dot size in small steps as it approaches its target size.

After this next application, and short delay to insure dot growth has terminated, the photocell detector 36 once again reads pixel density and control system 38 compares the readings to the reference signals to determine which of the pixels have reached a predetermined value of comparison, and are therefore at or very close to target density, and those other pixels that need yet another round of thermal input to achieve greater size.

In this manner, the printing cycle continues until all of the pixels in the row have achieved target density at which point control system 38 aborts printing of the current line and initiates a new printing cycle in preparation for recording the next line which includes advancing or indexing sheet 10 to the next line position.

Figure 8:
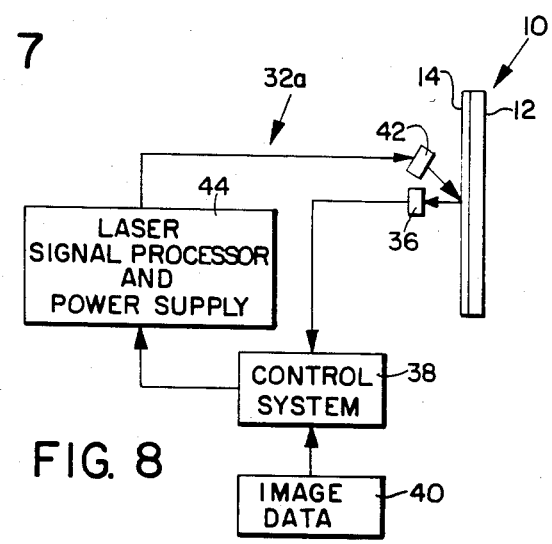
FIG. 8 is a diagrammatic representation of a thermal recording system embodying the present invention which has a laser diode print head.

The same feedback control concept may be used with thermal print heads other than the resistive type. For example, FIG. 8 shows an alternative embodiment of a thermal recording system embodying the present invention, designated system 32a, wherein the thermal print head 42 comprises a linear array of individually addressable laser diodes that are selectively energized by a laser signal processor and power supply 44 operated under the control of control system 38. Alternatively, a single scanning laser could be used.

Because a laser diode emits light which is converted to heat upon impact with layer 14, it does not have to make contact with layer 14 as does a resistive heating element. Therefore, the laser print head 42 and photodetector 36 may be located on the same side of sheet 14 facing the thermal recording layer 14. This is possible because print head 42 may be sufficiently spaced from layer 14 so that it does not block or obscure the field of view of the photocell detector 36. Thus, in this configuration of the thermal recording system, there is no need to apply heat to layer 14 from the backside through base sheet 12.

Further details of the thermal recording system 32 employing a resistive type print head 16 will now be described with reference to FIG. 9. In the illustrated embodiment, system 32 is configured for line printing.

The thermal recording sheet 10 is fed vertically from a supported supply roll 46 down between the horizontally disposed printhead 16 and an oppositely disposed spring loaded pressure plate 48 having a central opening therein in the form of a horizontally extending slot 50, an then between a pair of stepper motor driven paper drive or indexing rollers 52 and 54 located below print head 16. Collectively these components serve as means for supporting a thermally sensitive medium in position for recording.

The print head 16 is of the electrically resistive heating element type previously described and has the concave heater strip 26 in engagement with the backside of base sheet 12. The pressure plate 48 extends across the width of sheet 10 and is disposed so that slot 50 is in registration with the heater strip 26 thereby providing an observation window for monitoring dot formation on the front side of sheet 10. Plate 48 bears against layer 14 on the front side of sheet 10 and is urged rearwardly by a pair of compressed springs 56 mounted on fixed supports suggested at 58 for pressing that portion of sheet 10 against head 16 to maintain pressure contact between strip 26 and the backside of base sheet 12.

There are many commercially available line printing thermal heads that are suitable for use in system 32. Typical representative examples include types KC3008, KC2408, KC2017 and KH1502 marketed by Rohm Corp., Irvine, CA. Within this group of heads, heating element density ranges from approximately 150 to 300 elements per inch.

If one were to use a head 16 that is designed to produce 200 dots per inch, then a maximum size dot 30, that substantially fills a pixel area PA, would measure just less than 0.005 inches across its width. A minimum size dot 30 formed in a pixel area PA to define a fairly low density pixel, say in a range of 5 to 20%, would measure approximately 0.001 inches across its width. However, dot size alone does not determine perceived density, especially at the smaller sizes. This is because the small dots that are initially formed on the thermal paper reaching its threshold temperatures tend to be less dense, or dark, than a larger size dot.

Spaced forwardly of pressure plate 48, in registration with the observation window defined by slot 50, is the photocell detector or sensor 36 for optically monitoring the density of each pixel area in the current line to be recorded.

Preferably, detector 36 comprises a linear array of photodiodes (designated 60 in FIG. 9) or the like which are equal in number and spacing to the heating elements E on head 16 for receiving reflected light from corresponding ones of the pixel areas PA. However, if the size or spacing of the photodiodes 60 differs from those of the heating elements E, it is preferable to provide a compensating optical component between the line of photodiodes 60 and the observation window 50 to maximize efficiency of the dot monitoring process.

One type of commercially available detector 36 that is suitable for use in system 32 is the series G, image sensor marketed by Reticon Corp. The photodiode array has a pitch of 1000 diodes per inch. If it is used in conjunction with a print head 16 that has 200 elements per inch, this means that a pixel area PA is 5 times larger than the photodiode area so the photodiode will not "see" the entire pixel area PA. This condition may be corrected by locating an objective lens 62 in the optical path which serves to provide a focused image of the larger pixel area on the smaller size photodiode.

While it is possible to sense the level of ambient light reflected from the pixel areas registered with slot 50, it is preferable to provide supplemental illumination for this area in the interest of improving efficiency and obtaining consistent and reliable density readings.

In the illustrated embodiment, system 32 includes an illumination source 64, in the form of a lamp 66 and associated reflector 68, positioned in front of and above pressure plate 48 for directing light onto the strip of sheet 10 registered in the observation window 50. Inasmuch as photodiodes tend to be very sensitive to infrared wavelengths, it is preferable to use a lamp 66, such as a florescent lamp, that does not generate much infrared radiation to prevent overloading the photodiodes with energy outside of the visible light band that carries pixel density information. Alternatively, if the type of lamp 66 selected for use does include a signficant infrared component in its spectral output, an optional infrared blocking filter 70 (shown in dotted lines) may be located in front of the photodiodes 60 to minimize erroneous readings.

Figure 9:
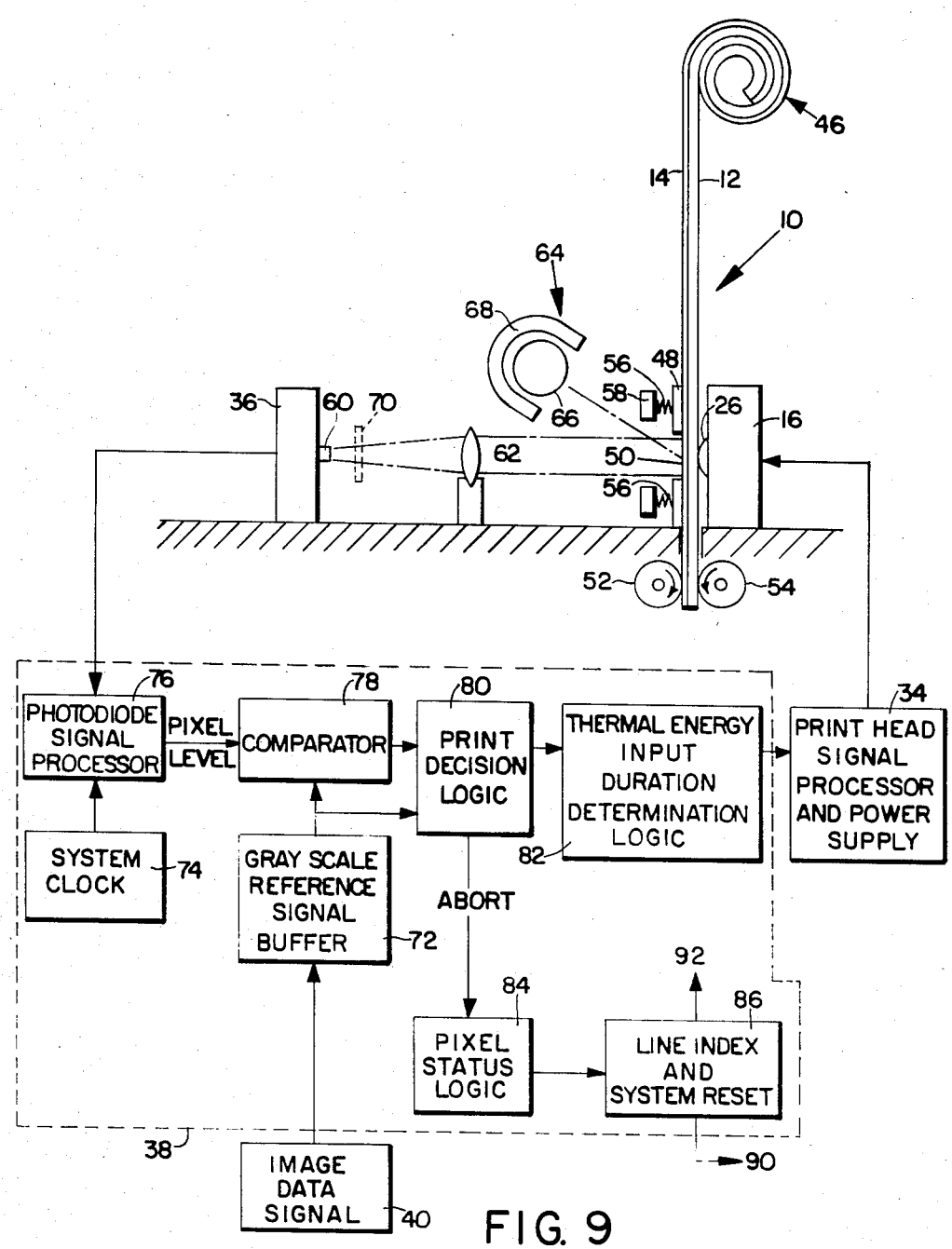
FIG. 9 is a more detailed diagrammatic representation of the system shown in FIG. 7.

In FIG. 9, functional components of the control system 38 are shown in block diagram from within the bounds of a dotted rectangle 38.

In preparation for recording a monochromatic image on sheet 10, electronic image data input signals 40 defining the pixel by pixel density of the image matrix are fed into means for receiving these signals, such as a grey scale reference signal buffer memory 72. Preferably, the image signals are in digital form provided from an image processing computer or digital data storage device such as a disk or tape drive. If the electronic image signals were originally recorded in analog form from a video source, it is preferable that they undergo analog to digital conversion, in a manner that is well known in the art before transmission to buffer 72. Alternatively, as noted earlier, control system 32 may optionally include an analog to digital signal conversion subsystem for receiving analog video signals directly and converting them to digital form within control system 38. Preferably, buffer 72 is a full frame image buffer for storing the entire image, but it also may be configured to receive portions of the image signals sequentially and for this purpose buffer 72 may comprise a smaller memory storage device for holding only one or two lines of the image.

Thus, control system 38 includes means for receiving electronic image signals which it utilizes as grey scale reference signals that define desired or target pixel densities for comparison with observed density signals provided from the optical monitoring photodiode detector 36 in the feedback loop.

The operation of control system 38 is coordinated with reference to a system clock 74 which among other things sets the timing for serially reading the light level or pixel density signals from each of the photodiodes 60 in the linear array. Light level signals from detector 36 are fed into a photodiode signal processor 76 which converts analog signals provided from detector 36 to digital form. Alternatively, this A/D conversion may take place in a subsystem incorporated into detector 36.

Density signals from processor 76 along with reference signals from buffer 72 are fed into a signal comparator 78 which provides signals indicative to the comparison to a print decision logic system 80. Based on the comparison information, system 80 provides either a print command signal or an abort signal for each pixel in the current line. Print command signals are fed to a thermal input duration determining logic system 82, and abort signals are fed to a pixel status logic system 84.

Upon receiving a print command, system 82 utilizing look-up tables therein to set the time period for energizing each of the heating elements that are to be activated and feeds this information to the print head signal processor and power supply 34 which actuates the selected heating elements in accordance with these instructions.

The abort signals to system 84 keeps track of which pixels have been recorded and those that yet need additional thermal input for completion. When abort signals have been received for every pixel in the current line being printed, system 84 provides an output signal to a line index and system reset system 86.

System 86 provides a first output signal designated 90 which actuates a stepper motor (not shown) for driving the paper feed rollers 52 and 54 to advance sheet 10 one line increment in preparation for recording the next image line. Additionally, system 86 puts out a reset signal, designated 92, for resetting components of control system 38 in preparation for recording the lext line.

In the elongated array of photodiodes 60, most likely there will be some variations in output or sensitivity among the individual photodiodes 60. However, during factory calibration variations may be noted and correction factors may be easily applied in the form of a calibration software program to compensate for such variations. Likewise, variations in the thermal output characteristic of each of the heating elements E in print head 16 may be determined by calibration measurement and corrected with a compensating software program that automatically adjust energization times of the individual heating elements to produce uniform thermal outputs across the array.

In the operation of recording system 32, a thermal recording cycle is initiated by actuation of the print decision logic system 80. Actuation may be accomplished by the operator manually actuating a start button (not shown).

In response to actuating system 80, grey scale reference signals indicating the desired or target densities of all of the pixels in the first line are sent from buffer 72 to system 80. System 80 evaluates this information and for those pixel areas in which no dot is to be recorded, so as to represent the lightest tone in the grey scale, abort signals are sent to the pixel status logic system 84. Print command signals for those pixel areas in which a dot is to be printed are transmitted from system 80 to system 82. System 82, using the look-up tables, provides initial thermal input duration signals indicative of the time period that each heating element E is to be energized to print an initial dot in its corresponding pixel area PA.

To minimize the length of the line recording cycle, it is preferable that the initial dot be smaller than the final dot size but large enough so that the number of successive thermal energy applications needed to to make a dot of the required size is not excessive.

For example, system 82 will provide initial thermal input time signals to form an initial dot that is approximately 75%-85% of the final or desired dot size. This means, that each initial dot will be smaller than the pixel area in which it is formed. Even if the reference signals indicate that a high density dot which substantially fills the pixel area is to be recorded, initially a smaller dot will be formed which provides an optically detectable input for the feedback loop utilization to achieve precise control over dot size or pixel density.

The initial duration signals are fed from system 82 to the print head signal processor and power supply 34 which is capable of addressing each of the elements E in print head 16 and applying supply voltage thereto for the initial times indicated.

The energized heating elements E apply thermal energy to the backside of the print paper 10 and cause the recording of the initial dots which are now visible in the observation window defined by slot 50. The line of dots are illuminated by light source 64 and the density of each pixel area PA is read by the photodiode detector 36. These signals are transmitted to processor 76 which provides the pixel density level signal indication to comparator 78 for comparing the initial pixel density with the target density signals provided from reference signal buffer 72.

Correlating the photodiode output signals to the refelective characteristics of any particular type of sheet 10 may be done by taking test readings on a blank sheet 10 to establish a reference signal level for highest reflectivity which is indicative of the lowest density or brightest pixel in the grey scale. As a preferable alternative, the setting of the reference level may be built into the recording cycle by having system 32 automatically take a photocell reading of the pixel areas PA registered in the observation window prior to energizing the print head to record the initial dots therein.

As noted earlier, additional dot growth may occur subsequent to deenergization of a heating element E in print head 16 due to heat build up in the head structure and thermal inertia. Therefore, it is preferable to delay the photodetector reading for a short time after the heating elements are deenergized so that any additional growth will be included in this reading.

The pixel density readings are compared to the reference signals by comparator 78 which supplies signals indicative of the difference therebetween to the print decision logic system 80. Because the initial dot size was calculated to be smaller than the final dot size the vast majority of the differential signals will indicate that additional thermal input is necessary to make each of the dots slightly larger. However, because of the variability of thermal recording parameters, at least some of the dots may have reached desired size even though the initial thermal input was intended to create a dot of only 75%-85% of desired size. For these pixels, system 80 provides abort signals to the pixel status system 84 and terminate any further thermal input thereto during the next portion of the recording cycle.

For those pixels that have not yet reached the target or desired density, system 80 will issue print commands to system 82 which will then provide signals indicative of the time needed to produce additional dot growth. Because the objective is now to make the dots only a little bit larger than initial size, the duration of print element energization will be shorter than the times used to record the larger initial dots.

Thermal input pulse duration times will, of course, depend on the thermal sensitivity characteristics of the particular paper 10 employed. If a particular paper 10 requires a 10 millisecond pulse to form a full size high density dot when the energy is applied through base layer 12, the initial pulse typically would be in the range of 6 to 8 milliseconds to form the initial dot. One or more subsequent pulses to induce further growth toward target size typically would be in the range of 2 to 4 milliseconds, remembering that at least a portion of the subsequent pulse duration only serves to bring the temperature up to the threshold value.

The print head elements E are energized and, following a short delay for thermal stabilization, the photodiodes 60 once again read pixel density and feed the signals back to the comparator 78 to test these readings against the reference levels. Again, the system 80 recycles in this manner with abort signals being provided for those dots that have reached their target size and print commands being provided for pixel areas that need additional thermal input to bring their density up to target level. Once the pixel status system 84 indicates that all of the pixels in the line are at target density, system 84 triggers the line index and reset system 86 which causes the paper to be moved in one line increment and various control components to be reset in preparation for recording the next image line.

Thus, a typical line recording cycle comprises the steps of sensing the reflected light level of the pixel areas registered in the observation window to establish an initial reference level indicative of the lowest density pixel; in accordance with the grey scale reference signals, energizing the print head elements to record initial dots in selected pixel areas which are smaller than necessary to achieve target density; following a delay to allow for additional dot growth due to heat build up and thermal inertia, sensing the reflected light level of line of pixel areas to measure or observe the density of the initial dots; comparing the observed density with the target density; and based on this comparison initiating the application of additional thermal energy to those pixel areas which require large dots to bring them up to target density and also terminating further input of thermal energy to those pixel areas where the comparison indicates that a predetermined comparison value has been achieved.

If, for example, the monitored density is very close to the target density, say in the range of 92 to 98% of target, it may be very difficult to tailor the next round of thermal input to that pixel area to achieve the very small amount of additional growth needed to reach target density. Therefore, rather than risk making the dot larger then needed to achieve an exact match with target density, it would be preferable to abort any further application of thermal energy to that particular pixel area.

In the above described process, the desired dot in each pixel area is formed in steps. First an initial dot is made and it is measured for comparison against the grey scale reference signal then, if necessary, one or more additional short pulses of thermal energy are sequentially applied to that pixel area to bring it up to its target density. Through the use of feedback, dot size can be controlled to a much higher degree than if this system were to simply operate in an open loop manner with dot size being correlated to the duration of thermal energy input for each pixel area.

As an alternative to the stepwise mode of operation, system 32 may be configured for continuous power application with feedback monitoring of dot formation. In this case, the heating elements E corresponding to the pixel areas PA in the line that are to have dots recorded therein in accordance with grey scale reference signals are all turned on simultaneously. As the dots appear and continue to grow, pixel density is continuously monitored and compared to the reference levels. When the predetermined comparison value is achieved for a given pixel area, the system automatically deenergizes its corresponding heating element. While this mode of operation may shorten the recording cycle somewhat compared to the stepwise dot formation cycle, the degree of control over dot size may not be as great because additional dot growth due to heat built up and thermal inertia is not accounted for in the control provided by the feedback loop. A certain amount of additional growth may be anticipated and the heating elements could be turned off at a lower predetermined value of comparison to provide some compensation for this additional dot growth. However, it would seem that the higher degree of accuracy provided by the stepwise method may be preferable unless there is an urgent need to reduce recording cycle time.

While the illustrated embodiments of recording systems 32 and 32A have been portrayed as line recording systems, it is within the scope of the invention to modify these systems for scanning mode operation wherein a print head and accompanying photodetector that are narrower than a full line are moved back and forth across the width of a paper to effect image recording. Also, the print head and photodetector may be configured to record on more than one line or to record the entire image so as to minimize or eliminate the need for relative movement between the components of the recording system and the thermally sensitive recording medium.

The thermal recording system embodying the present invention achieves control over pixel density by sensing and feeding back information about the system's output in the form of the information that is recorded. While in the illustrated embodiment, dot sensing or monitoring is achieved with an electro-optical photodetector operating in the visible light band, it is within the scope of the invention to modify the system and employ other types of detectors which may operate at other wavelengths or may include other types of structures (for example fiber optics) to monitor recorded pixel density.

Also, while the illustrated embodiments sense and feedback information about recorded output by directly "looking at" the recorded information, it is also within the scope of the invention to acquire the information indirectly perhaps by sensing another indicator associated with the recording medium that is indicative of recorded pixel density.

Because certain other modifications or changes may be made in the above described thermal recording system and method without departing from the spirit and scope of the invention involved herein, it is intended that all matter contained in the above description or shown in the accompanying drawings be interpreted as illustrative and not in a limiting sense.

What is claimed is:

1. A thermal recording system for recording an image represented by pixel areas of varied density on a thermally sensitive recording medium of the type wherein dot size increases with increased amounts of thermal energy applied to form a dot, said recording system comprising:
    means for receiving image information indicative of a desired density for each pixel area of the desired image;
    means operable for applying thermal energy to selected pixel areas on the recording medium in accordance with said image information to form a dot in each having an initial size smaller than needed to achieve its said desired density;
    evaluating means including means for monitoring the density of each selected pixel area and means for comparing the monitored density of each to its said desired density; and
    means responsive to said evaluating means for regulating said energy applying means to progressively increase the size of said initial size dot in each of said selected pixel areas until a predetermined value of density comparison is achieved for each said selected pixel area.

2. The recording system of claim 1 wherein said means for applying thermal energy is configured to engage the medium to apply thermal energy thereto.

3. The recording system of claim 2 wherein the recording medium includes an opaque base layer and a thermally sensitive recording layer on one side of the base layer and wherein said thermal energy applying means is configured to engage and apply thermal energy to a side of the base layer opposite the one side and said monitoring means is located on an opposite side of the medium from said energy applying means where it faces the thermally sensitive layer so that it may monitor the selected pixel areas without being obstructed by said energy applying means.

4. The recording system of claim 1 wherein said thermal energy applying means is located in non-engaging spaced relation to the recording medium for applying thermal energy thereto.

5. The recording system of claim 4 wherein said the recording medium includes a base layer and a thermally sensitive recording layer on one side of the base layer and wherein said thermal energy applying means and said monitoring means are both located on the same side of the medium facing the recording layer.

6. The recording system of claim 5 wherein said thermal energy applying means includes means for emitting light onto the recording layer where it is converted to thermal energy to effect recording.

7. The recording system of claim 1 wherein the thermally sensitive medium is a thermally sensitive recording sheet and wherein said energy applying means and said monitoring means are located on opposite sides of the recording sheet.

8. The recording system of claim 1 wherein the thermally sensitive medium is a thermally sensitive recording sheet and wherein said energy applying means and said monitoring means are located in facing relation to the same side of the recording sheet.

9. The recording system of claim 1 wherein said monitoring means includes optical means for receiving light reflected from said selected pixel areas.

10. The recording system of claim 1 wherein said monitoring means includes electro-optical means for sensing the reflected light level of each selected pixel area.

11. The recording system of claim 1 wherein said means for receiving image information is configured to receive said information in the form of electronic image signals.

12. The recording system of claim 1 wherein the initial size dot in each selected pixel area is formed in response to an initial application of thermal energy and thereafter is progressively increased by one or more subsequent applications of thermal energy.

13. The recording system of claim 1 wherein the application of thermal energy to each selected pixel area, to form a dot of said initial size and thereafter progressively increase its size until said predetermined value of density comparison is achieved, is continuous.

14. A thermal recording system for recording an image represented by pixel areas of varied density on a thermally sensitive recording medium of the type wherein dot size increases with increased amounts of thermal energy applied to form a dot, said recording system comprising:
  means for supporting such a recording medium;
  means for receiving image signals indicative of a desired density for each pixel area of the desired image;
  means operable for applying thermal energy to selected pixel areas on the medium to form a dot in each selected pixel area;
  means for optically monitoring said selected pixel areas and for providing density signals indicative of the density of each selected pixel area;
  means for comparing said density signals with said image signals and for providing density comparison value signals for each selected pixel area; and
  means for operating said energy applying means, said operating means initially being responsive to said image signals for regulating an initial application of thermal energy to selected pixel areas to form in each dot having an initial size smaller than necessary to achieve its said desired density and, thereafter, being responsive to said density comparison value signals for regulating further application of thermal energy to progressively increase the size of said initial size dot in each selected pixel area until a predetermined value of density comparison is achieved for each said selected pixel area.

15. The recording system of claim 14 wherein said initial application of thermal energy is separate from any further application of thermal energy.

16. The recording system of claim 14 wherein said energy applying means is configured to engage the recording medium for applying thermal energy thereto.

17. The recording system of claim 16 wherein the recording medium comprises an opaque base sheet and a thermally sensitive recording layer on the front side of the base sheet, and wherein said energy applying means is configured to apply thermal energy to the backside of the base sheet for the transmission therethrough to the recording layer.

18. The recording system of claim 17 wherein said optical monitoring means is located to the front of the recording medium in facing relation to the recording layer where its view of the selected pixel areas is unobstructed by said energy applying means.

19. The recording system of claim 18 wherein said energy applying means includes a thermal print head having a plurality of individually addressible heating elements for recording dots in corresponding ones of a plurality of pixal areas on the recording medium in registration with said heating elements, and said monitoring means includes a plurality of individual addressible photodiodes for sensing the reflected light level of the corresponding pixel as an indication of pixel area density.

20. The recording system of claim 14 wherein said progressive increase in dot size is achieved in steps by applying successive thermal energy inputs to each selected pixel area.

21. The recording system of claim 14 wherein said progressive increase in dot size is continuous in response to a continuous application of thermal energy to each selected pixel area.

22. The recording system of claim 14 wherein said energy applying means includes a linear array of heating elements for recording a line of the desired image at a time, and said optical monitoring means includes a linear array of photodiodes for sensing the density of each of the pixel areas in the line being recorded.

23. The recording system of claim 22 further including means for advancing the medium relative to said heating elements and photodiodes to record successive image lines thereon.

24. The recording system of claim 22 wherein said pixel areas are of a different size than said photodiodes in said array and said system further includes optical means for providing a focused image of each pixel area in a line onto a corresponding one of said photodiodes.

25. The recording system of claim 14 wherein said optical monitoring means includes means for sensing the brightness of light reflected from each of the selected pixel area and for providing a signals indicative of pixel area density.

26. The recording system of claim 25 further including a light source for illuminating pixel areas monitoring by said sensing means.

27. The recording system of claim 14 wherein said energy applying means is configured to engage the medium and said system further includes pressure applying means for urging at least a portion of the medium into engagement with said energy applying means.

28. A thermal recording system for recording an image represented by pixel areas of varied density on a thermally sensitive recording medium of the type wherein dot size increases with increased amounts of thermal energy applied to form a dot, said recording system comprising:
  means for supporting such a recording medium;
  means operable for applying thermal energy to selected pixel areas on the medium to form a dot in each selected pixel area;
  means for monitoring said selected pixel areas and for providing density signals correlated to dot size which are indicative of the density of each selected pixel area; and
  control means for controlling a recording cycle, said control means including means for receiving image signals indicative of a desired density for each pixel area of the desired image, means for comparing said density and image signals and for providing density comparison value signals, and means for operating said energy applying means, said operating means initially being responsive to said image signals for regulating an initial application of thermal energy to selected pixel areas to form in each a dot having an initial size smaller than necessary to achieve its said desired density and, thereafter, being responsive to said density comparison value signals for regulating further application of thermal energy to progressively increase the size of said initial size dot in each selected pixel area until a predetermined value of density comparison is achieved for each said selected pixel area whereupon said operating means terminates any further application of thermal energy to those selected pixel areas.

29. The recording system of claim 28 wherein said control means establishes a feed back loop between said energy applying and monitoring means.

30. A method of thermally recording an image represented by pixel areas of varied density on a thermally sensitive recording medium of the type wherein dot size increases with increased amounts of thermal energy applied to form a dot, said recording method comprising the steps of:
providing image information indicative of a desired density for each pixel area of the desired image;
applying thermal energy to selected pixel areas on the recording medium in accordance with said image information to form a dot in each having an initial size smaller than necessary to achieve its said desired density;
monitoring the density of each selected pixel area;
comparing the monitored density of each selected pixel area to its said desired density; and
based on said comparison, applying additional thermal energy to said selected pixel area to progressively increase the size of said initial size dot in each until a predetermined value of density comparison is achieved and thereupon terminating application of thermal energy.

31. The method of claim 30 wherein the medium includes a base sheet having a thermal recording layer on the front side thereof and said thermal energy is applied to the back side of said base sheet for transmission therethrough to said recording layer.

32. The method of claim 31 wherein the density of each selected pixel area is monitored on the front side of the recording medium.

33. The method of claim 30 wherein there is a delay between the application of thermal energy to form said dot of initial size and said monitoring of pixel area density to allow for an increase in dot size due to thermal inertia.

34. The method of claim 30 wherein density is monitored optically and said method further includes the step of illuminating said selected pixel areas to facilitate such optical monitoring.

35. The method of claim 30 wherein said additional application of thermal energy is provided in successive discrete energy pulses to cause a stepwise progressive increase in dot size.

36. The method of claim 30 wherein said thermal energy is applied with thermal energy applying means configured to record only a portion of said image at a time and said method includes the further step of advancing the medium relative to said energy applying means to record successive portions of said image.

37. The method of claim 30 wherein density is monitored with an array of photodetectors and thermal energy is applied with an array of electrically resistive heating elements.

38. The method of claim 37 wherein said pixel areas are of different size than said photodetectors and said method includes the further step of optically focusing an image of said selected pixel areas on corresponding ones of said photodetectors in said array.

* * * * *